No. 884,582.  
PATENTED APR. 14, 1908.  
H. HENN.  
VESSEL WITH DOUBLE WALLS AND PROTECTIVE CASE.  
APPLICATION FILED OCT. 18, 1907.
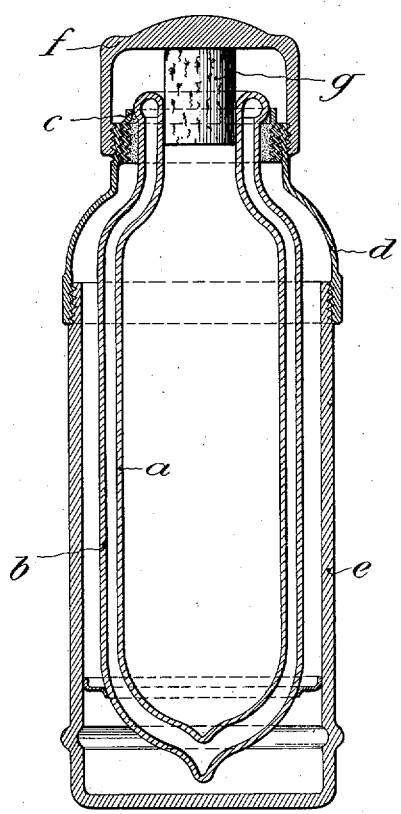

UNITED STATES PATENT OFFICE.

HUBERT HENN, OF BERLIN, GERMANY, ASSIGNOR, BY MESNE ASSIGNMENTS, TO AMERICAN THERMOS BOTTLE COMPANY, OF BROOKLYN, NEW YORK, A CORPORATION OF MAINE.

VESSEL WITH DOUBLE WALLS AND PROTECTIVE CASE.

No. 884,582.     Specification of Letters Patent.     Patented April 14, 1908.

Application filed October 18, 1907. Serial No. 398,049.

*To all whom it may concern:*

Be it known that I, HUBERT HENN, merchant, residing at No. 44 Schönhauser-Allee, Berlin, Germany, a subject of the King of Prussia, German Empire, have invented a new and useful Improved Vessel with Double Walls and Protective Case, of which the following is a full, clear, and exact specification.

The present invention relates to vessels with double walls which inclose in a well known manner a space in which a vacuum exists. Such vessels have hitherto been fastened in a protective jacket of any material in a suitable manner, for example by fastening the neck of the vessel with plaster of paris in the upper part of the protective jacket. As the protective jacket in itself is likewise rigid, it is very difficult to introduce a new double - walled vessel into the protective jacket if the former is destroyed by accident. Moreover, the mode of fastening the vessel by securing it with plaster of paris or the like as hitherto adopted does not by any means satisfy requirements with regard to security and cleanliness. It has not been possible to remove the liquid in a clean and simple manner at the joint or the mouth of the vessel. Also it has not been in any way possible to exchange the vessels easily when cleaning the vessels or when a breakage has occured.

By means of the present invention the vessels can be easily exchanged by the vessels being screwed into the upper members of the protective jackets by means of screw-threads on their necks or in the neighborhood of their mouths.

A practical embodiment of my invention is illustrated in the accompanying drawings which represent the bottle, jacket and cup in vertical central section.

On the double-walled vessel which consists of two walls $a$, $b$, inclosing the space in which a vacuum exists, there is fastened a collar $c$ on the upper part of the outer wall $b$, said collar being provided with a screw-thread. This threaded collar $c$ which is fastened by plaster of paris or the like below the edge of the mouth of the bottle, is screwed into the upper member $d$ of the protective jacket for the bottle. On the upper member $d$, a body member $e$ is screwed, said body member serving as the protective jacket proper for the vessel and at the same time serving to close the same. The upper member $d$ is provided with another screw-thread which serves for screwing on the protective cup $f$. After screwing off said cup from the upper member and removing the cork $g$, the edge and outlet of the vessel are perfectly free so that on pouring out the liquid none of the latter can pass through the joint between the vessel and the protective jacket. By screwing off the body member $e$, the vessel can be very readily removed from the upper member and then be thoroughly cleaned by itself or in the case of a breakage, be readily replaced by another.

What I claim is:

1. The combination with a jacket composed of separable members, of a cup and a vacuum insulated bottle, both removably secured to one of said jacket members.

2. The combination with a jacket having an upper member and a body member having a screw threaded engagement therewith, of a vacuum insulated bottle also having a screw-threaded engagement with said upper jacket member.

3. The combination with a jacket having an upper member and a body member having a screw-threaded engagement therewith, of a cup and a vacuum insulated bottle, both having screw-threaded engagements with said upper jacket member.

4. The combination with a jacket having an upper member and a body member having a screw-threaded engagement therewith, of a vacuum insulated bottle having a collar at its neck provided with a screw-threaded portion arranged to engage the upper jacket member.

5. In combination, a vacuum insulated bottle, a cup and a jacket comprising an upper member and a body member removably secured thereto, said upper member having a screw-threaded portion, the inner wall of which is arranged to be engaged by the vacuum insulated bottle and the outer wall of which is arranged to be engaged by the cup.

Dated this 3d day of October, 1907.

In witness whereof I have hereunto set my hand in presence of two witnesses.

HUBERT HENN.

Witnesses:
    WOLDEMAR HAUPT,
    HENRY HASPER.